(12) United States Patent
Mruk et al.

(10) Patent No.: US 7,399,985 B2
(45) Date of Patent: Jul. 15, 2008

(54) OPTICAL NON-CONTACT SENSOR FOR DETECTING MATERIAL LEVEL IN A CONTAINER

(75) Inventors: Walter Mruk, Chatham, NJ (US);
Martin Adams, Chatham, NJ (US);
William Kilkerr, Kettering (GB);
Nicholas Bell, Desborough (GB);
Robert Barnacle, Chester, NJ (US)

(73) Assignee: DataOnline, L.L.C., Berkeley Heights, NJ (US)

( * ) Notice: Subject to any disclaimer, the term of this patent is extended or adjusted under 35 U.S.C. 154(b) by 0 days.

(21) Appl. No.: 11/457,206

(22) Filed: Jul. 13, 2006

(65) Prior Publication Data

US 2008/0011970 A1    Jan. 17, 2008

(51) Int. Cl.
*G01N 15/06* (2006.01)
*G01N 21/49* (2006.01)
*G01N 21/85* (2006.01)

(52) U.S. Cl. ............... 250/577; 73/293; 73/319
(58) Field of Classification Search .......... 73/293, 73/290 B, 290 R, 319; 250/577; 220/377, 220/602, 663
See application file for complete search history.

(56) References Cited

U.S. PATENT DOCUMENTS

| | | | | |
|---|---|---|---|---|
| 4,247,784 A | * | 1/1981 | Henry | 250/577 |
| 5,073,253 A | * | 12/1991 | Bishop | 209/164 |
| 6,568,263 B1 | | 5/2003 | Snelling | |
| 6,615,658 B2 | | 9/2003 | Snelling | |
| 7,017,408 B2 | * | 3/2006 | Ramus et al. | 73/293 |

FOREIGN PATENT DOCUMENTS

| | | | |
|---|---|---|---|
| JP | 407275977 A | * | 10/1995 |
| JP | 10-300558 | * | 5/1997 |

* cited by examiner

*Primary Examiner*—Georgia Y. Epps
*Assistant Examiner*—Francis M Legasse, Jr.

(57) ABSTRACT

A detection system for determining material level in a container where the container has an opening and an optical window mounted to the opening. A sensor element is mounted to the container adjacent the window. The sensor element has an optical emitter and an optical receiver positioned to form a triangular vertex with the material surface level within the container.

12 Claims, 2 Drawing Sheets

OPTICAL NON-CONTACT SENSOR FOR DETECTING MATERIAL LEVEL IN A CONTAINER

BACKGROUND OF THE INVENTION

The present invention relates generally to a system for detecting the material level in a container, and more particularly to an optical non-contact sensor system for measuring the volume of material within a container.

Conventional storage vessels, such as propane tanks, are beneficial both for their mobility and for their suitability to the energy needs of remote locations where access to other forms of energy is often unavailable or costly. It is desirable to be able to detect the volume of liquid in such a vessel at any specific time so as to schedule re-supply (sometimes referred to as re-charging) of the tank thereby to prevent emptying of the vessel (sometimes referred to as "running dry".) Sensors for measuring the elevation of the upper surface of liquid contained in a vessel are known. In operation, such a sensor generates an electrical signal indicative of the quantity of liquid in the vessel. The signal is transmitted to an interface located externally of the vessel which communicates to a user the quantity of liquid in the vessel.

One such type of internal sensor is a float-type gauge. Such a gauge normally has limited accuracy because it contains moving parts such as the float and associated linkage for sensing vertical displacement of the float as the upper surface of the liquid rises and falls. With movement comes associated friction to which the moving parts are subjected thereby causing wear to the gauge and eventual degradation. Additionally, a float-type gauge includes fragile portions, such as the linkage connected to the float which must be sufficiently delicate to translate vertical displacement of the float to the stationary base of the gauge for measuring the displacement. The fragility of the moving parts makes them susceptible to damage.

Alternatively, a computer may be used to estimate the level, i.e., elevation, of the liquid in a vessel relative to the interior bottom surface of the vessel. In particular, specially designed software may be used to monitor usage and predict when refill or recharging is necessary. Previous liquid usage patterns are considered, as well as weather and other data. While of some use, computers have been found to have limited reliability in predicting the amount of liquid in the vessel at a specific time and, in particular, the time when the vessel will become completely empty if not recharged. Such prediction may be especially difficult when the usage patterns are variable.

While these prior art systems have addressed some of the problems in the art, these systems are expensive to manufacture and greater accuracy is still desired. Therefore, there exists a need in the art to address these deficiencies.

An object of the present invention is to provide a detection system that is more accurate in measuring the material level of a container.

A further object of the present invention is to provide a detection system that is more economical to manufacture.

A still further objective of the present invention is to provide a detection system that provides information for a variety of uses.

These and other uses will be apparent to one of ordinary skill in the art based upon the following written description.

SUMMARY OF THE INVENTION

A detection system for determining material level in a container where the container has an opening and an optical window mounted to the opening. A sensor element is mounted to the container adjacent the window. The sensor element has an optical emitter and an optical receiver positioned to form a triangular vertex with the material surface level within the container.

DETAILED DESCRIPTION OF THE PREFERRED EMBODIMENT

Figure 1:
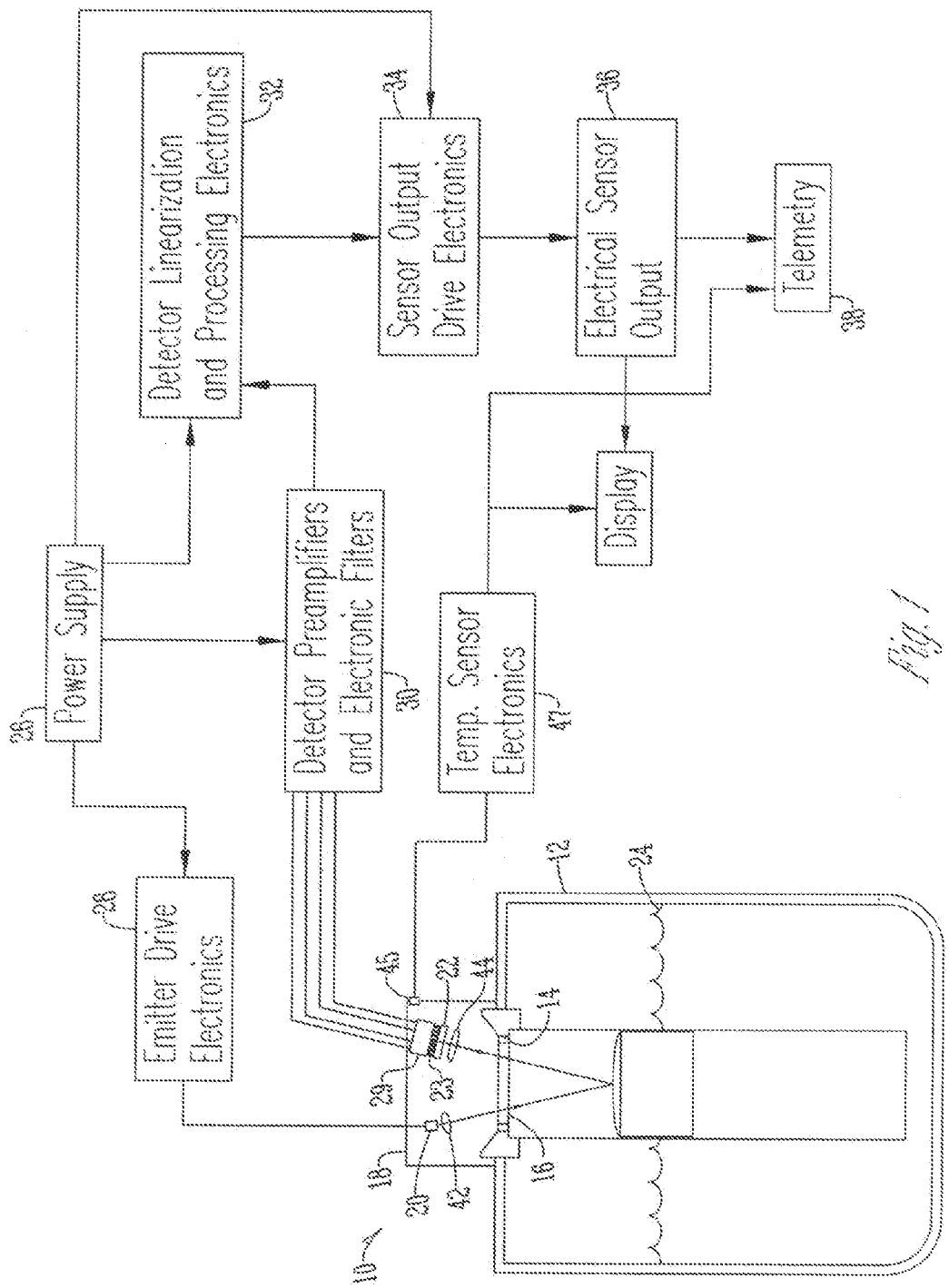
FIG. 1 is a schematic figure of the detection system.
Figure 2:
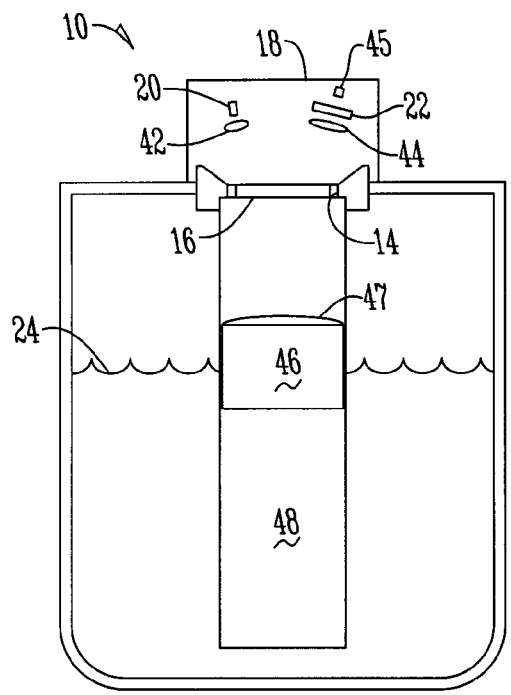
FIG. 2 is a side view of an alternative embodiment of a detection system.
Figure 3:
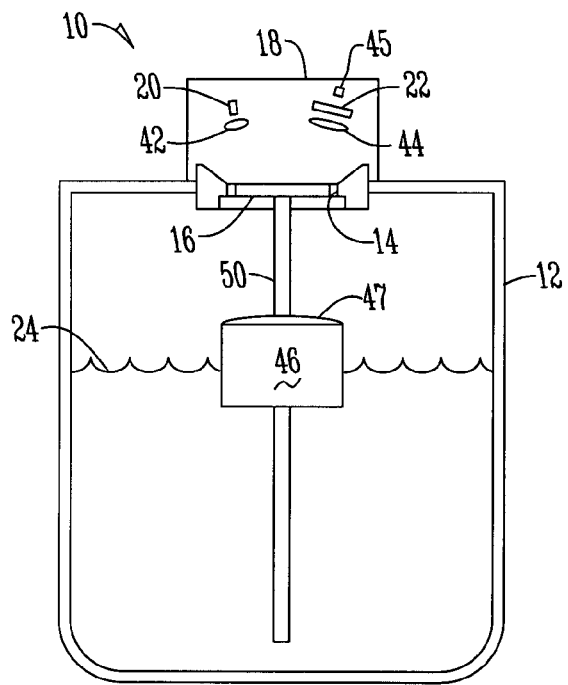
FIG. 3 is a side view of an alternative embodiment of a detection system.

Referring to the Figures, the detection system 10 is used to measure the level and volume of material in a container 12. The container 12 is of any type with an opening 14. Mounted to the opening 14, in any conventional manner, is a window 16. The window 16 is of any shape and preferably is tapered to guard against blow out caused by a window to window frame seal failure. In this preferred embodiment, the end of the tapered window having a greater diameter is positioned to face the high pressure side of the container 12.

Mounted to the container 12 adjacent the window 16, is a sensor element 18. The sensor element 18 is of many types and preferably includes an optical emitter 20 and an optical receiver 22 such as an optical detector array or a position sensitive detector (PSD). The optical emitter 20 and optical receiver 22 are positioned to form a triangle vertex with the surface 24 of the material within the container 12. A configuration for sensing longer distances may be suitable for sensing shorter distances in some containers. Thus, in an alternate embodiment multiple sensor elements 18 are employed where one is optimized for long ranges and one for short ranges to yield a sensor element 18 accurate over both short and long distances.

The sensor element 18 has a power supply or battery 26. The optical emitter 20 is connected to emitter drive electronics 28 that are powered by the power supply 26. Connected to the optical receiver 22 are detector preamplifiers and electronic filters 30 that are connected to detector linearization and processing electronics 32 that are connected to sensor output drive electronics 34. The sensor output drive electronics 34 are connected to electrical sensor output 36 that is connected to telemetry 38 and a display 40.

Positioned adjacent the optical emitter 20 and optical receiver 22 are an optically transmissive emitter lens 42 and an optically transmissive detector lens 44. Also, positioned adjacent to the optical emitter 20 and optical receiver 22 is a temperature sensor 45. The temperature sensor 45 measures ambient temperature which is useful in determining how full a tank is. The temperature sensor 45 is connected to temperature sensor electronics 47 that are connected to both telemetry 38 and the display 40.

If the sensor were to operate in an environment with high levels of ambient optical radiation with respect to the sensor emitter levels, interference with the material surface reflection upon the sensor detectors could result. When the ambient optical radiation is visible or ultra-violet, the incorporation of an infra-red sensor emitter and infra-red pass filter (not shown) over the detector assembly or as the detector lens 44 material itself, prevents such interference. The present invention contemplates using infrared optical radiation from a light emitting diode (or laser diode), however, it is not the intention of this invention to preclude the use of any other optical radiation spectrum or source. Optical radiation interference can also be eliminated by designing a closed optical system which precludes the infiltration of ambient optical energy into the sensor detectors or material enclosure in general.

In operation, optical radiation is emitted from the optical emitter 20 through lens 42 toward the surface 24 of the material and is reflected back through lens 44 to the optical receiver 22. Because the optical emitter 20 and optical receiver 22 are in relatively fixed positions, the changing distance between the emitter 20 and receiver 22 and the material surface 24 causes the reflected optical radiation to be at a different angle when reaching the receiver lens, therefore incident upon a different area of the receiver sensor, which corresponds to a change in distance due to the optical triangulation.

The position of the optical radiation upon the receiver 22 may be determined electrically and related to the distance from the material surface 24 to the other sensor elements resulting in a non-contact level measurement technique. The position of the optical radiation upon the receiver 22 or the electrical signal generated by that position, with respect to the distance from the material surface 24 is stored in the sensor 18 and used to calibrate the emitter drive electronics 28. With proper positioning of the sensor elements 18 a small change in the reflected radiation position on the receiver 22 may be made to correspond to a large change in the sensed distance. The use of a multi-element linear detector array 23 will enable a digital output signal to be generated by determining the position of the array element with the greatest optical signal strength. A position sensitive detector 29 will enable an analog signal output proportional to the area on the PSD with the greatest optical signal strength.

The positioning of the sensor elements, particularly the optical lenses and emitter-detector separation, determines the working distances from the sensor to the material being sensed.

The optical triangulation distance measurement operates most reliably with diffuse reflections from the material surface 24. Specular reflections from the surface 24 or optical radiation penetration into a liquid may cause undesirable reflections to the sensor element 18. To accommodate for this an optically diffuse reflective float 46 is mounted within the container 12. Preferably the float 46 has a convex top 47. In one embodiment a perforated tube 48 is mounted adjacent to the window 16 and extends into the container 12. The float 46 resides captive within the tube 48 and changes position in relation to the surface 24 of the material in the container 12. The distance from the sensor element 18 to the float 46 is sensed and further processed to provide a usable scaled output signal. The internal surface of the tube 48 is fabricated to preclude undesirable reflections from reaching receiver 22. This is accomplished via spiral machining, surface diffusion, surface absorption of optical radiation or a combination of each.

In another embodiment a rod 50 extends from the sensor element 18 into container 12. The float 46 is slidably mounted to the rod 50. The distance from the sensor element 18 to the float 46 is determined and further processed to provide a usable scaled output signal.

It may be desirable to environmentally separate the sensor element 18 from the container 12 for numerous industrial applications. In one embodiment of the design an environmentally sealed optically transmitting window 16 is placed between the sensor element 18 and associated electronics and the material to be sensed or the diffuse reflective float 46, as part of the overall sensor housing. In another embodiment of the design the optical window 16, with or without the reflective float 46, is separate from the sensor element 18 and associated electronics and may be independently incorporated into the container 12. This two part design facilitates incorporation of the level sensor into the container manufacturing by enabling sealed containers to be retrofitted with the level sensor electronics at a later date without breaching the container seal or initially supplying the electronics package. In either embodiment the optical window(s) may also be the emitter and detector lenses themselves. In any embodiment that contains a window it may be desirable to provide a means for preventing unwanted reflections from the optical emitter from reaching the optical detector assembly. In one embodiment of the design the optical emitter and the optical detector assembly lenses are in close proximity to the optical window and their respective separation precludes emitted radiation from coinciding with the field of view of the detector, therefore no undesirable reflections occur. In another embodiment of the design an optically opaque separator is placed between the optical emitter and the optical detector assembly lenses precluding emitted radiation from coinciding with the field of view of the detector. In a further embodiment of the design the optical window is angled with respect to the axis of the detector field of view so that reflections miss the detector active area.

Analog and digital signal processing, an ambient temperature sensor, calibration look-up tables, and real time clock circuits within the sensor follow the detector array or PSD section and are capable of applying predetermined computational routines to the signals obtained by the detector array or PSD. In the simplest form of the computations, the position information from the detector array is converted to a distance measurement from the sensor to the material level. Other processing routines may account for the dimensions and shape of the container in association with the detected level to yield actual volumetric readings of the container contents. It is anticipated that the sensor will be paired with, or become an integral part of, a complete telemetry system used to monitor levels and/or ambient temperatures, store and time stamp readings, and transmit the data to a remote location. If system power conservation is required, as may be for a solar powered embodiment, the timing of the sensor initiating a reading may be controlled depending upon the frequency with which data is required. An additional claim of the invention is the ability to preprogram and remotely reprogram the sensor to coincide with external events such as, but not limited to, time of day, ambient temperature, rate of change of ambient temperature, and material usage.

Therefore, a detection system for detecting the material level in a container has been disclosed that, at the very least, meets all of the stated objectives.

The invention claimed is:

1. A detection system for determining the level and volume of material comprising:
   a container having a tapered window, wherein the end of said window having a greater diameter faces the interior of said container;
   a sensor element mounted to the container adjacent the window and having an optical emitter and an optical receiver, and
   the optical emitter and optical receiver positioned to form a triangular vertex with a material surface level within the container;
   wherein the optical receiver is operably connected to a multi-element linear detector array for generating a digital signal and to a position sensor detector for generating an analog signal.

2. The system of claim 1 wherein a float is mounted within the container.

3. The system of claim 2 wherein the float resides within a tube that extends from the window into the container.

4. The system of claim 2 wherein the float is slidably mounted to a rod that extends from the sensor element into the container.

5. The system of claim 2 wherein the float has a convex top.

6. The system of claim 1 wherein the sensor element is connected to telemetry.

7. The system of claim 1 wherein the sensor is connected to a display element.

8. The system of claim 1 wherein a temperature sensor is positioned adjacent the sensor element.

9. The system of claim 1 wherein the sensor element includes multiple sensors for sensing different ranges.

10. The system of claim 1 further comprising an optically opaque separator disposed between the optical emitter and optical receiver.

11. The system of claim 1 further comprising an optical filter positioned over said optical receiver.

12. The system of claim 3 wherein the internal surface of said tube is prepared using at least one method selected from the group of spiral machining, surface diffusion, and surface absorption of optical radiation.

* * * * *